United States Patent Office 3,703,517
Patented Nov. 21, 1972

3,703,517
4-[(CARBOXYALKYL)AMINO]-5-PYRIMIDINE-CARBOXYLIC ACID ESTERS
Dong H. Kim, Wayne, and Arthur A. Santilli, Havertown, Pa., assignors to American Home Products Corporation, New York, N.Y.
No Drawing. Original application Aug. 14, 1968, Ser. No. 752,487, now Patent No. 3,641,028, dated Feb. 8, 1972. Divided and this application May 14, 1971, Ser. No. 143,612
Int. Cl. C07d 51/42
U.S. Cl. 260—256.4 N      2 Claims

ABSTRACT OF THE DISCLOSURE

The disclosure is directed to 5 - hydroxy - 7H-pyrrolo[2,3-d]pyrimidine-6-carboxylic acid esters and to 4-[(carboxyalkyl)amino]-5-pyrimidinecarboxylic acid esters. All these compounds have central nervous system activity as depressants while the latter compounds may also be used in the preparation of the former compounds.

---

This application is a division of our application Ser. No. 752,487 filed Aug. 14, 1968 now U.S. Pat. 3,641,028.
This invention relates to new and useful pyrimidine and pyrrolopyrimidine derivatives. More particularly, this invention is directed to 5-hydroxy-7H-pyrrolo[2,3-d]pyrimidine-6-carboxylic acid esters with the 4-[(carboxyalkyl)amino]-5-pyrimidinecarboxylic acid dialkyl esters which are intermediates in their preparation.

The closest prior art is believed to be described by E. C. Taylor and R. W. Hendess, J. Am. Chem. Soc., 86,952 (1964), Chem. Abstracts 60 12007f. In that article 4-amino-7H-pyrrolo[2,3-d]pyrimidine-5-carboxylic acid is described. The latter compound has the same ring system as the compounds of the present invention but the functional groups are at different locations. There is no teaching or suggestion how to prepare the compounds of the present invention.

The compounds within the purview of the present invention are exemplified by those having the following formula:

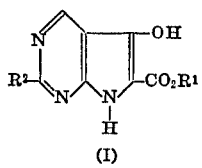

(I)

where $R^1$ is lower alkyl; and $R^2$ is lower alkyl, phenyl, halophenyl, lower alkylphenyl, and lower alkoxyphenyl.

As used herein the terms "lower alkyl," "lower alkoxy" and the like, describe groups containing from one to about eight carbon atoms.

A typical example of the compounds of this invention which are depicted by structural Formula I is 5-hydroxy-2-phenyl-7H-pyrrolo[2,3-d]pyrimidine-6-carboxylic acid, ethyl ester.

Also contemplated by the present invention are compounds having the following formula which, as is further described below, are intermediates in the production of the above-described compounds depicted by structural Formula I.

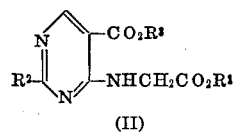

(II)

where $R^1$–$R^2$ are as defined above; and $R_3$ is ethyl or methyl.

A typical example of the compounds of this invention which are depicted by structural Formula II is 4-[(carboxymethyl)amino]-2-phenyl-4-pyrimidinecarboxylic acid diethyl ester.

The new and novel compounds of this invention may be prepared by the process which is hereinafter schematically illustrated:

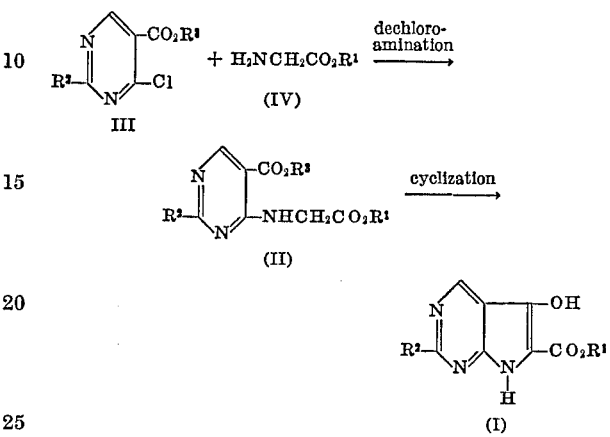

where $R^1$, $R^2$ and $R^3$ are as described above.

The 5 - hydroxy - 7H-pyrrolo[2,3-d]pyrimidine-6-carboxylic acid esters (I) of this invention may be prepared in a two step process as shown in the foregoing reaction scheme. In the dechloramination step a 5-carbalkoxy-4-chloropyrimindine (III) is added to a hot mixture obtained by refluxing a glycine ethyl ester or its acid salts in an alkanol for a period of about ½ to about 3 hours with vigorous mechanical stirring. Thereafter, the resulting mixture is heated at a temperature range of about 60 to about 80 degrees C. for a period of about ½ to about 3 hours. The resulting inorganic salt which precipitates, is removed by filtration, and the reaction mixture is cooled, affording the product (II).

Preferably the reaction is carried out in ethanol, if $R^3$ is ethyl, or in methanol if $R^3$ is methyl, at the reflux temperature for about one hour, and preferably, and acid scavenger such as sodium carbonate, is utilized to neutralize the hydrochloric acid generated by the reaction.

When the reaction is complete, the product (II) may be separated and purified by methods well known in the art. For instance, the precipitate may be collected on a filter and dissolved in ether, and insoluble material removed by filtration. The ether filtrate may be evaporated to dryness affording a product, a 4 - [(carboxymethyl)amino]-5-pyrimidinecarboxylic acid dialkyl ester (II) which may be recrystallized from ethanol.

In the cyclization step, the above intermediate product 4 - [(carboxymethyl)amino]-5-pyrimidinecarboxylic acid dialkyl ester (II) is treated with a strong base, such as sodium in an alkanol. Methanol is used where $R^1$ is methyl, and ethanol is used where $R^1$ is ethyl. While other metals may be used, as is known in the art, sodium and potassium are preferred because they will dissolve in the solvents being used and because they produce strong bases. The resulting mixture is heated at a temperature range of about 60 to about 80° C., for a period of about ½ to 3 hours affording the product (I). Preferably, the mixture is heated at the reflux temperature for about 45 minutes.

When the reaction is complete the product (I) may be separated and recovered by well known methods. For instance, excess solvent may be removed under reduced pressure and the residue dissolved in hot water. Acidification of the aqueous solution with a mineral acid e.g. hydrochloric acid, to pH 3 causes the product (I) to precipitate. Thereafter, the solution is chilled and the precipitate collected on the filter and recrystallized from absolute ethanol.

The starting materials of the present invention are readily available or may be prepared by methods well known in the art.

The new and useful 4-[(carboxymethyl)amino]-5-pyrimidinecarboxylic acid, dialkyl esters (II) of the present invention are useful as intermediates in the preparation of 5-hydroxy-7H-pyrrolo[2,3-d]pyrimidine-6-carboxylic acid, esters (I) of this invention. These former compounds (III) also have utility as central nervous system depressants; that is, they exert a calming effect in the host.

The new and novel 5-hydroxy-7H-pyrrolo[2,3-d]pyrimidine-6-carboxylic acid, esters (I) of the present invention have utility as central nervous system depressants; that is they exert a calming effect in the host.

In the pharmacological evaluation of the biological activity of the compounds of this invention, the in vivo effects are tested as follows. The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) autonomic activity (i.e., miosis, mydriasis, diarrhea) are noted.

The 4-[(carboxymethyl)amino]-5-pyrimidinecarboxylic acid dialkyl esters (II) and 5-hydroxy-7H-pyrrolo[2,3-d]pyrimidine-6-carboxylic acid esters (I) induce central nervous system depressant effects at 400 milligrams per kilogram of host body weight when administered intraperitoneally.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful, or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

This example illustrates the preparation of 4-[(carboxymethyl)amino] - 2 - phenyl-5-pyrimidinecarboxylic acid, diethyl ester, a compound of structure II.

Two and six-tenths grams (g.) of 5-carbethoxy-4-chloro-2-phenylpyrimidine is added to a hot mixture obtained by refluxing 4.2 g. of glycine ethyl ester hydrochloride and 3.48 g. of sodium carbonate in 30 milliliters (ml.) of 95 percent ethanol for one hour with vigorous mechanical stirring. The resulting mixture is refluxed for an additional 0.5 hour. After removing the inorganic salt by filtration, the reaction mixture is chilled. The precipitate thus formed is collected on a filter, and dissolved in ether. After removing insoluble material from the ether solution by filtration, the ether is evaporated to dryness leaving an oil which solidifies on chilling. The product weighs 1.9 g. and melts at 85–87.5° C. Recrystallization from 95 percent ethanol increases the melting point to 86–88° C.

Based on the formula $C_{17}H_{19}N_3O_4$, it was calculated that the elemental analysis by weight would be 61.99 percent carbon, 5.82 percent hydrogen, and 12.76 percent nitrogen. The product was analysed and the content was found to be 62.04 percent carbon, 5.72 percent hydrogen and 12.94 percent nitrogen. The foregoing may be expressed:

*Analysis.*—Calcd. for $C_{17}H_{19}N_3O_4$ (percent): C, 61.99; H, 5.82; N, 12.76. Found (percent): C, 62.04, H, 5.72; N, 12.94.

EXAMPLES II–XIII

Following the procedure of Example I, but substituting the appropriate starting materials, the following products are afforded:

(II) 4-[(carboxymethyl)amino]-2-methyl-5-pyrimidinecarboxylic acid, dimethyl ester
(III) 4-[(carboxymethyl)amino]-2-(p-ethylphenyl)-5-pyrimidinecarboxylic acid, 4-ethyl ester, 5 methyl ester
(IV) 4-[(carboxymethyl)amino]-2-(m-methoxyphenyl)-5-pyrimidinecarboxylic acid, 4-butyl ester, 5-ethyl ester
(V) 4-[(carboxymethyl)amino]-2-(o-chlorophenyl)-5-pyrimidinecarboxylic acid, 5-methyl ester, 4-propyl ester
(VI) 2-butyl-4-[(carboxymethyl)amino]-5-pyrimidinecarboxylic acid, 5-ethyl ester, 4-methyl ester
(VII) 2-(p-butylphenyl)-4-[(carboxymethyl)amino]-5-pyrimidinecarboxylic acid, 4-ethyl ester, 5-methyl ester
(VIII) 2-(p-butoxyphenyl)-4-[(carboxymethyl)amino]-5-pyrimidinecarboxylic acid, 5-ethyl ester, 4-propyl ester
(IX) 4-[(carboxymethyl)amino]-2-(p-iodophenyl)-5-pyrimidinecarboxylic acid, 4-butyl ester, 5-methyl ester
(X) 4-[(carboxymethyl)amino]-2-(m-fluorophenyl)-5-pyrimidinecarboxylic acid, 5-ethyl ester, 4-methyl ester
(XI) 2-(p-bromophenyl)-4-[(carboxymethyl)amino]-5-pyrimidinecarboxylic acid, diethyl ester
(XII) 4-[(carboxymethyl)amino]-2-(p-methylphenyl)-5-pyrimidinecarboxylic acid, dimethyl ester
(XIII) 4-[(carboxymethyl)amino]-2-ethyl-5-pyrimidinecarboxylic acid, diethyl ester

EXAMPLE XIV

This example illustrates the preparation of 5-hydroxy-2-phenyl - 7H - pyrro[2,3-d]pyrimidine - 6 - carboxylic acid, ethyl ester, a compound of structure I.

4-[(carboxymethyl)amino] - 2 - phenyl-4-pyrimidinecarboxylic acid, diethyl ester (4.94 g.) is added to 40 ml. of absolute ethanol containing 0.35 g. of sodium, and the resulting mixture is refluxed for 45 minutes. The excess ethanol is removed under reduced pressure to give a dark red oil which is dissolved in 125 ml. of hot water. Acidification of the aqueous solution with 3 normal (N) hydrochloric acid to pH 3 causes separation of precipitates. After chilling the mixture in ice, the precipitate is collected on a filter. The product weighs 2.7 g. Recrystallization from absolute ethanol affords a product having a melting point of 194.5–197° C.

*Analysis.*—Calcd. for $C_{15}H_{13}N_3O_3$ (percent): C, 63.59; H, 4.63; N, 14.83. Found (percent): C, 63.64; H, 4.48; N, 14.77.

EXAMPLES XV–XXVI

Following the procedure of Example XIV, but substituting appropriate starting materials, the following materials are afforded:

(XV) 5-hydroxy-2-methyl-7H-pyrrolo[2,3-d] pyrimidine-6-carboxylic acid, methyl ester (XVI) 2-(p-ethylphenyl)-5-hydroxy-7H-pyrrolo[2,3-d] pyrimidine-6-carboxylic acid, ethyl ester (XVII) 5-hydroxy-2-(m-methoxyphenyl)-7H-pyrrolo-[2,3-d]pyrimidine-6-carboxylic acid, butyl ester (XVIII) 2-(o-chlorophenyl)-5-hydroxy-7H-pyrrolo-[2,3-d]pyrimidine-6-carboxylic acid, propyl ester (XIX) 2-butyl-5-hydroxy-7H-pyrrolo[2,3-d]pyrimidine-6-carboxylic acid, methyl ester (XX) 2-(p-butylphenyl)-5-hydroxy-7H-pyrrolo[2,3-d] pyrimidine-6-carboxylic acid, ethyl ester (XXI) 2-(p-butoxyphenyl)-5-hydroxy-7H-pyrrolo[2,3-d] pyrimidine-6-carboxylic acid, propyl ester (XXII) 5-hydroxy-2-(p-iodophenyl)-7H-pyrrolo[2,3-d] pyrimidine-6-carboxylic acid, butyl ester (XXIII) 2-(m-fluorophenyl)-5-hydroxy-7H-pyrrolo [2,3-d]pyrimidine-6-carboxylic acid, methyl ester (XXIV) 2-(p-bromophenyl)-5-hydroxy-7H-pyrrolo [2,3-d]pyrimidine-6-carboxylic acid, ethyl ester (XXV) 5-hydroxy-2-(p-tolylphenyl)-7H-pyrrolo[2,3-d] pyrimidine-6-carboxylic acid, methyl ester (XXVI) 2-ethyl-5-hydroxy-7H-pyrrolo[2,3-d]pyrimidine-6-carboxylic acid, ethyl ester The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from the group having the formula:

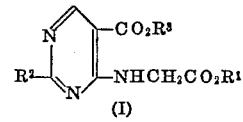

where $R^1$ is lower alkyl; and $R^2$ is selected from the group consisting of lower alkyl, phenyl, lower alkylphenyl, and lower alkoxyphenyl; and $R^3$ is selected from the group consisting of ethyl and methyl.

2. A compound as defined in claim 1 which is 4-[(carboxymethyl)amino] - 2 - phenyl-5-pyrimidinecarboxylic acid, diethyl ester.

References Cited

UNITED STATES PATENTS 3,641,028  2/1972  Kim et al. _____ 260—256.4

ALEX MAZEL, Primary Examiner

R. V. RUSH, Assistant Examiner